United States Patent [19]

Miguel et al.

[11] Patent Number: 5,695,311

[45] Date of Patent: Dec. 9, 1997

[54] APPARATUS FOR PRESSING ARRANGEMENTS OF UNITS SUCH AS TIERS OF HAY BALES AND METHOD OF STABILIZING THE SAME

[75] Inventors: Marvin B. Miguel, P.O. Box 506, Armona, Calif. 93202; Gordon M. Haugen, 13605 SW. Burlwood, Beaverton, Oreg. 97005; William J. Trindle, 17380 SW. Florence St., Aloha, Oreg. 97007

[73] Assignees: Marvin B. Miguel; Gordon M. Haugen; William J. Trindle, all of Portland, Oreg.

[21] Appl. No.: 444,086

[22] Filed: May 18, 1995

Related U.S. Application Data

[63] Continuation-in-part of Ser. No. 410,351, Mar. 24, 1995, abandoned.

[51] Int. Cl.[6] ................................................ B65G 57/28
[52] U.S. Cl. .......................... 414/786; 414/132; 414/111; 414/789.7
[58] Field of Search .................................. 414/111, 132, 414/788.9, 789.7, 501, 491, 786

[56] References Cited

U.S. PATENT DOCUMENTS

| | | |
|---|---|---|
| D. 312,718 | 12/1990 | McIlwain . |
| D. 312,827 | 12/1990 | Boddin et al. . |
| D. 317,011 | 5/1991 | Boddin et al. . |
| 3,688,919 | 9/1972 | Snider ............................ 414/789.7 |
| 3,788,495 | 1/1974 | Fachini et al. ..................... 414/501 |
| 3,826,389 | 7/1974 | Godfrey et al. ................... 414/789.7 |
| 3,884,367 | 5/1975 | Butler et al. ...................... 414/501 |
| 4,111,312 | 9/1978 | Wilson ............................ 414/789.7 |
| 4,190,392 | 2/1980 | Butler ............................. 414/501 |
| 4,203,695 | 5/1980 | Wynn et al. . |
| 4,227,845 | 10/1980 | Colby et al. . |
| 4,247,239 | 1/1981 | Miguel ............................ 414/789.7 |
| 4,363,583 | 12/1982 | Bontrager ........................ 414/501 |
| 4,386,555 | 6/1983 | Horiochi et al. . |
| 4,534,691 | 8/1985 | Miguel ............................ 414/111 |
| 4,605,259 | 8/1986 | Hurlburt . |
| 4,652,043 | 3/1987 | Hurlburt . |
| 5,036,942 | 8/1991 | Loewen . |
| 5,048,274 | 9/1991 | Jennings . |
| 5,405,229 | 4/1995 | Tilley et al. ..................... 414/111 |

FOREIGN PATENT DOCUMENTS

| | | |
|---|---|---|
| 2035916 | 6/1980 | United Kingdom ................ 414/111 |

*Primary Examiner*—Karen B. Merritt
*Assistant Examiner*—Douglas Hess
*Attorney, Agent, or Firm*—Kolisch Hartwell Dickinson McCormack & Heuser

[57] ABSTRACT

Apparatus for pressing vertical arrangements of units that are stored in an elongate container with a front, plural sides, and a cavity includes a mechanism coupled to the front and extending toward the rear of such container and including opposing arms. Each arm is located adjacent a corresponding, opposing side of such container, with the mechanism being actuable to move the arms toward each other a preselected distance as a way of pressing a first arrangement of subunits. The apparatus preferably includes a submechanism actuable with the arms to move inwardly toward the cavity a preselected distance as a way of pressing arrangements of subunits, i.e. loaded subunits, that have already been pressed by the mechanism. The apparatus may be formed as a combination tier and load pressor for use in an automatic bale wagon to press successive entering tiers of bales of hay that are received into an opening of a load bed associated with such bale wagon, and to press loaded tiers that are moved by successive entering tiers through the opening of the load bed and into a cavity defined by the load bed. Included with such a device is tier-pressor structure and load-pressor structure. The load-pressor structure is actuable to move with a preselected force against a first of such loaded tiers as a way of pressing such first loaded tier. There is also a method of stabilizing a tier of bales of hay.

2 Claims, 5 Drawing Sheets

APPARATUS FOR PRESSING ARRANGEMENTS OF UNITS SUCH AS TIERS OF HAY BALES AND METHOD OF STABILIZING THE SAME

BACKGROUND AND SUMMARY OF THE INVENTION

The present application is a continuation-in-pan of application U.S. Pat. application Ser. No. 08/410,351 filed on Mar. 24, 1995, and entitled APPARATUS FOR PRESSURING ARRANGEMENTS OF UNITS SUCH AS TIERS OF HAY BALES AND METHOD OF STABILIZING THE SAME, and now abandoned.

The present invention relates generally to apparatus for pressing or compressing arrangements of units. More particularly, the invention concerns a novel tierpressor mechanism for use in automatic bale wagons to press, compress or align bales of hay.

Automatic bale wagons, such as those described in U.S. Pat. Nos. 4,534,691, 4,203,695, and 4,227,845 are used to collect and stack bales of hay that lie in a field after being formed from loose hay by operation of a baler. Such bale wagons operate under a multi-stage process which involves successively collecting individual bales, orienting a certain number of the collected bales horizontally into what is called a tier, and then transferring each such tier by placing each on its side in a load bed. Ultimately, that number of tiers is unloaded from the bale wagon by actuating an unload mechanism that works somewhat like a dump truck, i.e. the load bed with its side-by-side tiers is pivoted about 90-degrees which results in positioning the tiers in a storage stack.

Such conventional bale wagons do not include a mechanism for stabilizing the tiers of bales while the latter are positioned on their sides in the load bed. Since the bale wagon travels over rough terrain while collecting bales, there is a tendency for the tiers to collapse in the load bed. For example, going over a bump can cause a central region of the forward tier to bulge forwardly, resulting in the entire tier collapsing. Ultimately, the other tiers in the load bed can also collapse as a result of the collapse of the forward tier because the tiers depend on adjacent ones for stabilization.

Relatively sudden braking of the bale wagon is another situation that causes such a collapse of the forward tier, and possibly other tiers.

When there is a collapse of tiers in the load bed, the job is delayed substantially because the fallen bales must be removed manually from the bale wagon and then suitably repositioned manually in the field for repetition of the above-described multi-stage process. There are also associated labor costs, including those related to the labor of repositioning the fallen bales for collection by the bale wagon. Such repositioning is only required when there is a collapse of unstable tiers. Prior to collection by the bale wagon, the bales are already suitably positioned in the field as a result of the baling process.

Another problem associated with conventional bale wagons is that the load beds have an opening with a fixed area which is not capable of receiving tiers that include bales with irregular dimensions. Not surprisingly, there is a variation in the dimensions of bales of hay. Sometimes, the variation is substantial enough that the overall cross-sectional area of a tier with one or more irregular bales exceeds the size of the opening in the load bed of the bale wagon. As a result, certain bales of the tier will be damaged (i.e. the excessively long dimension will be cut off by a side of the load bed that defines the fixed-dimension opening) or the tier will not be positioned properly in the load bed (i.e. it will be angled somewhat and will not be flush with respect to adjacent tiers).

There is also a problem associated with misaligned hay bales in the tier resulting in a hard-to-load tier with sides that are not substantially straight.

Conventional bale wagons do not deal with the problems caused by tiers with bales that are loosely stacked, with bales of irregular widths, or with misaligned bales.

Accordingly, it is a principal object of the present invention to provide a tier-stabilizing system which overcomes the drawbacks of prior-art proposals.

Another object is to provide such a system that adds vertical stability to such tiers.

Yet another object is to provide such a system that receives tiers of hay bales that have irregular dimensions such as widths, and that aligns tiers with irregular sides due to misaligned bales.

Another important object of the invention is to provide such a system that reduces the incidence of tiers collapsing in the load bed while the bale wagon is traveling through the field.

It is also an object of the invention to provide such a system that can be cost-effectively manufactured.

In brief summary, one aspect of the invention includes apparatus for pressing vertical arrangements of units that are stored preferably side-by-side in a container with an open front and plural sides. The apparatus includes a mechanism coupled to the front of such container, and preferably extending toward the rear of such container, that includes opposing arms. Each arm is located adjacent a corresponding, opposing side of such container, and the mechanism is actuable to move the arms toward each other a preselected distance as a way of pressing a first arrangement of subunits. The mechanism preferably includes a submechanism actuable with the arms to move inwardly toward such cavity a preselected distance as a way of pressing arrangements of subunits that have already been pressed by the mechanism.

Another aspect of the invention is to provide a combination tier and load pressor for use in an automatic bale wagon to press successive entering tiers of bales of hay that are received into an opening of a load bed associated with such bale wagon, and to press loaded tiers that are moved by successive entering tiers through the opening of the load bed and into a cavity defined by the load bed. The combination tier and load pressor includes tier-pressor structure coupled to the bale wagon adjacent such opening and being actuable to move against a first one of such entering tiers with a preselected force as a way of pressing such first entering tier. Also included is load-pressor structure with a first region fixedly coupled to the tier-pressor structure and a second region movably coupled to the bale wagon rearward of the opening. The load pressor structure is actuable to move with a preselected force against a first of such loaded tiers as a way of pressing such first loaded tier. The load-pressor structure preferably includes opposing vertical panel-like elements each of which are pivotably attached to the load bed.

Yet another feature of the invention is a method of stabilizing successive tiers of hay bales that are received into an opening of a load bed that defines a cavity assorated with an automatic bale wagon, with such tiers being characterizable as entering tiers and loaded tiers. The method includes the steps of positioning a first one of such entering tiers in such opening of such load bed, and pressing the first entering tier by moving tier-pressor structure against opposing sides of the tier. Also included are the steps of repeating the positioning step with respect to a second entering tier which causes the first entering tier to move rearwardly into the opening of the load bed thereby being characterizable as a first loaded tier, pressing the second entering tier by moving tier-pressor structure against opposing sides of the second entering tier, and pressing the first loaded tier by moving load-pressor structure against opposing sides of the first loaded tier.

These and other objects and advantages of the invention will be more clearly understood from a consideration of the accompanying drawings and the following description of the preferred embodiment.

DETAILED DESCRIPTION OF THE PREFERRED EMBODIMENT

Figure 1:
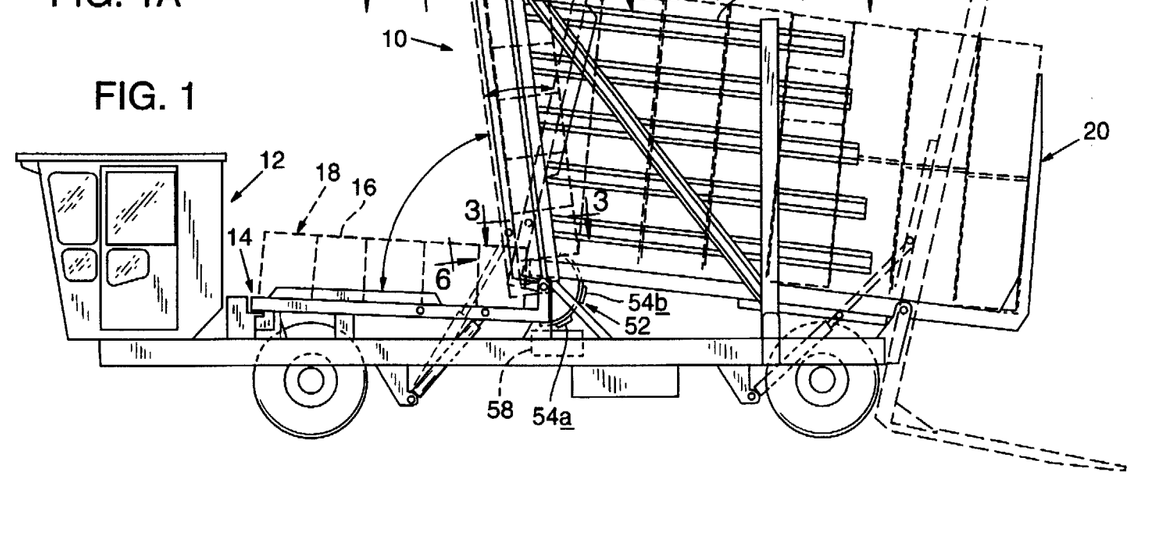
FIG. 1 is a left elevational view showing the preferred embodiment of the tier-pressor mechanism of the present invention.

FIG. 1 depicts a left elevational view of the tier-pressor mechanism of the present invention, being made in accordance with its preferred embodiment and indicated at 10. Tier pressor mechanism 10 may also be thought of herein as a tier compressor or tier alignor. Essentially, as will be described, tier pressor mechanism 10 applies a steady force to opposing sides of a tier of hay bales. That force may be sufficient to compress the tier. That pressing force may also be thought of as an aligning force that aligns tiers with misaligned hay bales that form irregular, i.e. not substantially linear, vertical sides of the tier. In addition, as will also be described tier pressor mechanism 10 preferably includes a submechanism, also called a load-pressor submechanism 11.

For the remainder of this description, the terms pressor mechanism and pressor structure will be used, but it should be understood that the terms compressor or alignor may be used interchangeably with pressor. In addition, referring to FIG. 6, pressor mechanism is shown by dashed lines in a press position, but that position may also be thought of as a compress position or an align position. The compress position would apply when a suitable force is applied to compress the tier. The align position would apply when a suitable force is applied to press in, or align, misaligned hay bales of the tier. Such misaligned hay bales are ones which would extend irregularly outwardly (undepicted) to the right and left in FIG. 6. In other words, the tier with such misaligned bales would not have substantially vertical sides like the tier shown in FIG. 6.

Figure 5:
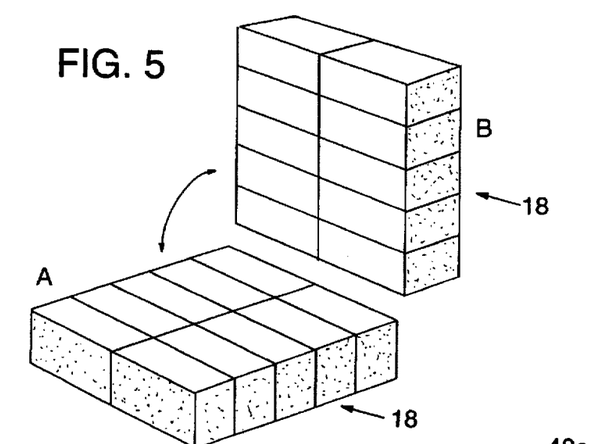
FIG. 5 illustrates horizontal and vertical positions of an example tier of hay bales, which positions occur using an automatic bale wagon constructed with the tier-pressor mechanism of the invention.

FIG. 1 illustrates how tier pressor 10 and load pressor submechanism 11 may be incorporated in a conventional automatic bale wagon 12. First, to put in perspective the structure and operation of tier pressor 10 and load pressor submechanism 11, conventional operational features of bale wagon 12 will be described. Bale wagon 12 has the usual tier-collecting/orienting table 14 which is pivotable approximately 90-degrees from a horizontal position (solid lines) to a vertical position (dashed lines). Using a conventional bale pickup (undepicted) fitted on wagon 12, bales of hay that lie in a field are successively picked up and transferred to table 14 for orienting a preselected number of bales 16 in a preselected arrangement to form a tier 18. Table 14 is actuated using a conventional hydraulic/electrical system to pivot about 90-degrees upwardly to transfer tier 18 from its horizontal position in table 14 to a vertical position in a load bed 20. Load bed 20 has associated with it the usual retractable back 20a which retracts as tiers are received to provide vertical back support for the tiers positioned in the load bed. FIG. 5 illustrates the positional change of tier 18 when it is moved from its generally horizontal position A on table 14 to its generally vertical position B at front opening 24 of load bed 20.

Still referring to FIG. 1, load bed 20 shows the usual load-bed construction with an open-top/open-front configuration and a holding space defined by a bottom, side and back surfaces of the bed. Successive tiers are formed and transferred to load bed 20 until it is full of vertical tiers positioned laterally relative to each other as shown by dashed lines in FIG. 1. Ultimately the load bed is emptied by a conventional unload mechanism (undepicted) that pivots load bed 20 approximately 90-degrees as shown by dashed lines in FIG. 1.

Focusing now on features of the tier pressor of the invention, tier pressor 10 is usable to press successive tiers, like tier 18, as each is transferred from table 14 to load bed 20. Preferably, pressor 10 presses a first tier until a second tier is transferred from table 14 to load bed 20. At that time, and as will be described further, pressor 10 stops pressing the first tier, and opens (returns to a first, neutral position) to allow a second tier to be moved to the location assumed by the first tier (and thereby push the first tier backward into the load bed).

In a more general sense, it should be understood that tier pressor 10 may be thought of as apparatus for compressing or aligning vertical arrangements, such as tier 18, of units, such as bales 12, that are stored preferably side-by-side in a container, such as load bed 20, having an open from and at least three sides. The container may be of a material-handling type, need not have vertical sides, and could be simply a flat-bed such as that associated with a flat-bed truck. For the remainder of this description, the apparatus of the invention will be described as a tier pressor because that is the presently preferred embodiment of it.

With respect to load pressor submechanism 11, it is used for containers that have vertical sides. As will be described, it functions to press tiers that have already been loaded onto load bed 20, i.e. loaded tiers, after each tier has been pressed by tier pressor 10.

Figure 6:
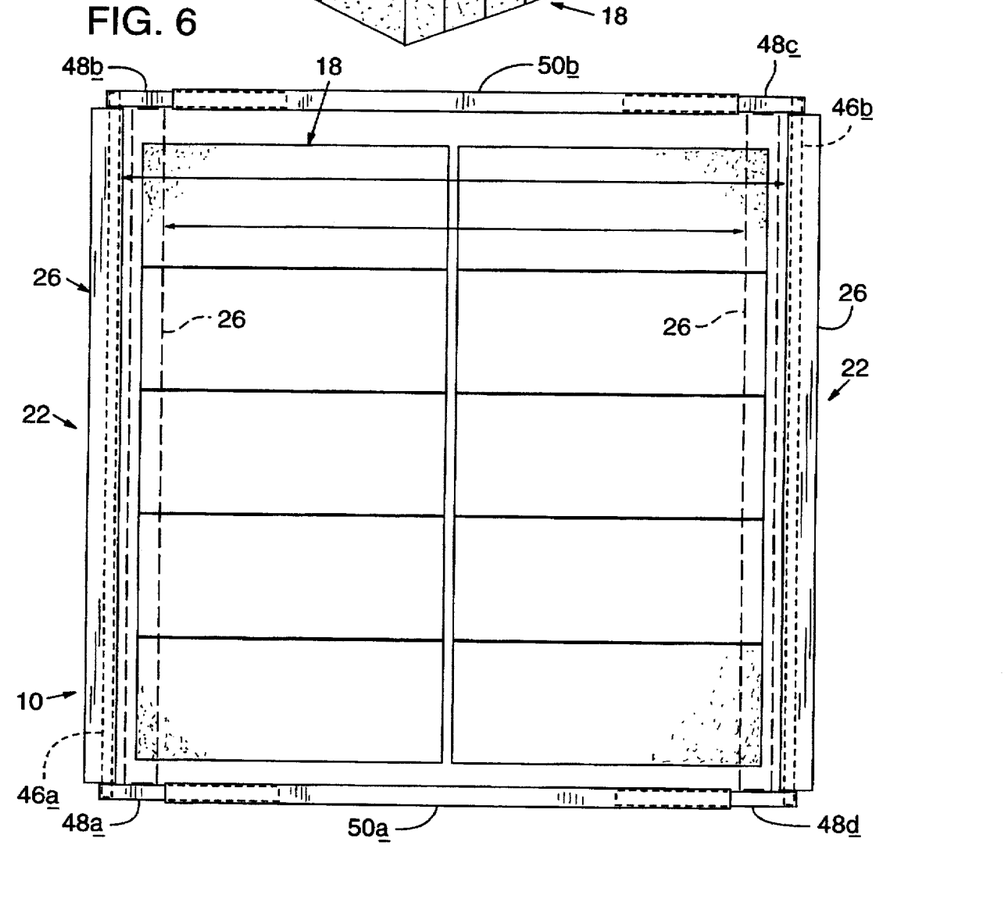
FIG. 6 is a front, elevational view of the tier-pressor mechanism of the invention shown in FIG. 4.

Referring now to FIGS. 2–4 and 6, tier pressor 10 includes pressor structure 22 coupled to bale wagon 12 adjacent front opening 24 (FIG. 1). Pressor structure 22 preferably includes opposing arms 26 and arm-actuator substructure 28. As will be described further, pressor structure 22 is actuable using arm-actuator substructure 28 to move arms 26 against a tier such as tier 18 with a preselected force as a way of pressing tier. The movement against tier 18 is shown in FIG. 6 by dashed lines.

Figure 2:
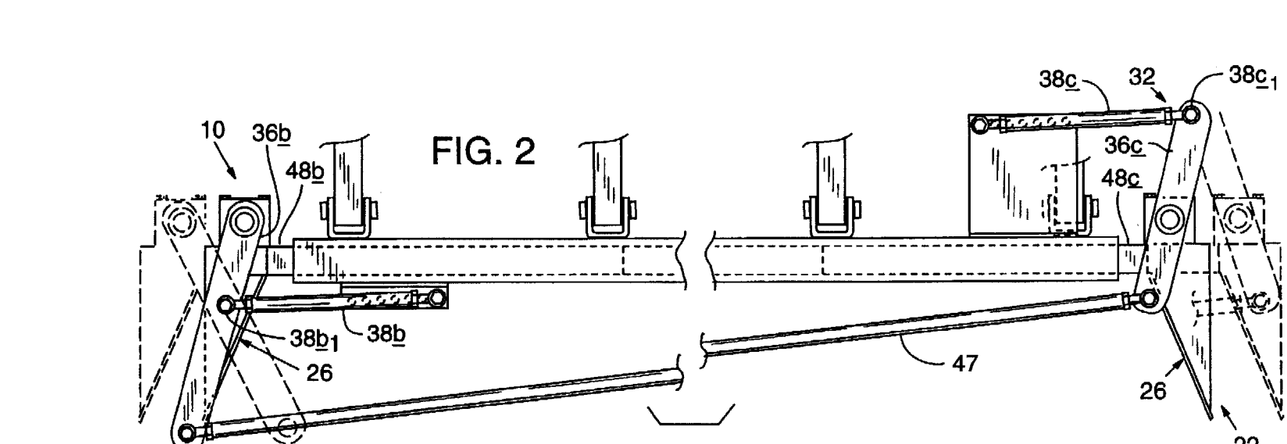
FIG. 2 is an enlarged, fragmentary, top view of the tier-pressor mechanism of the invention through line 2—2 of FIG. 1.
Figure 3:
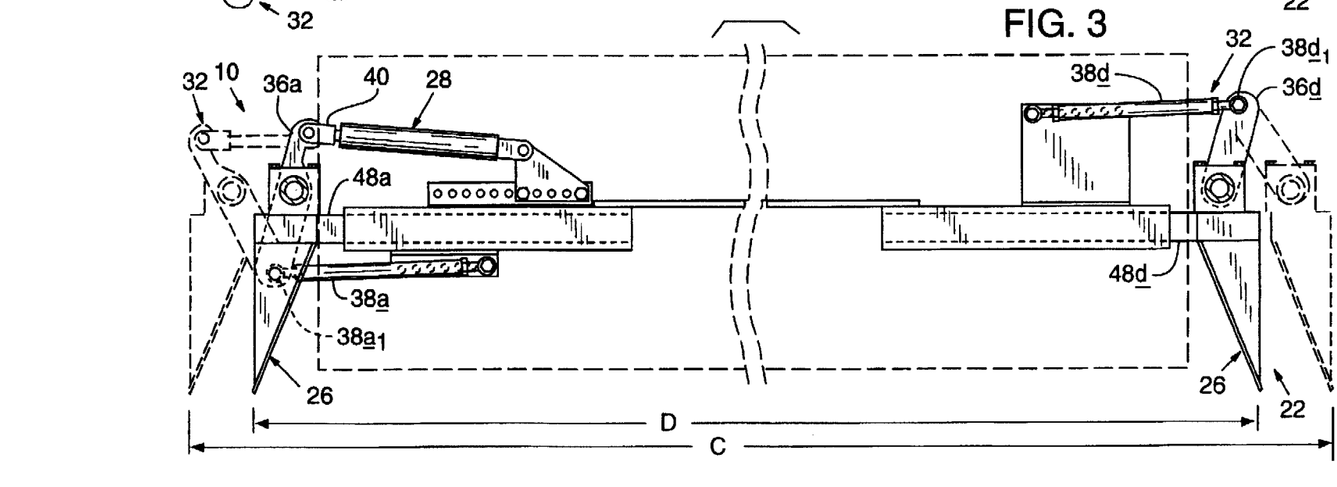
FIG. 3 is an enlarged, fragmentary, top view of the tier-pressor mechanism of the invention through line 3—3 of FIG. 1 with certain areas blocked out to focus attention on other areas.

Referring to FIGS. 2–3, arms 26 are shown in dashed lines in what may be thought of as a first, neutral position adjacent and forward of front opening 24 (FIG. 1), and defining an opening with a distance C. The solid line depiction of arms 26 in FIGS. 2–3 shows what may be thought of as a second, press position in which the arms are moved a suitable, preselected distance toward each other to press the tier. The opening defined by the second, press position has a distance D. In its preferred embodiment, pressor structure 22 is constructed so that distance D is less than that defined by front opening 24 (FIG. 1) and distance C is greater than that defined by front opening 24.

Figure 4:
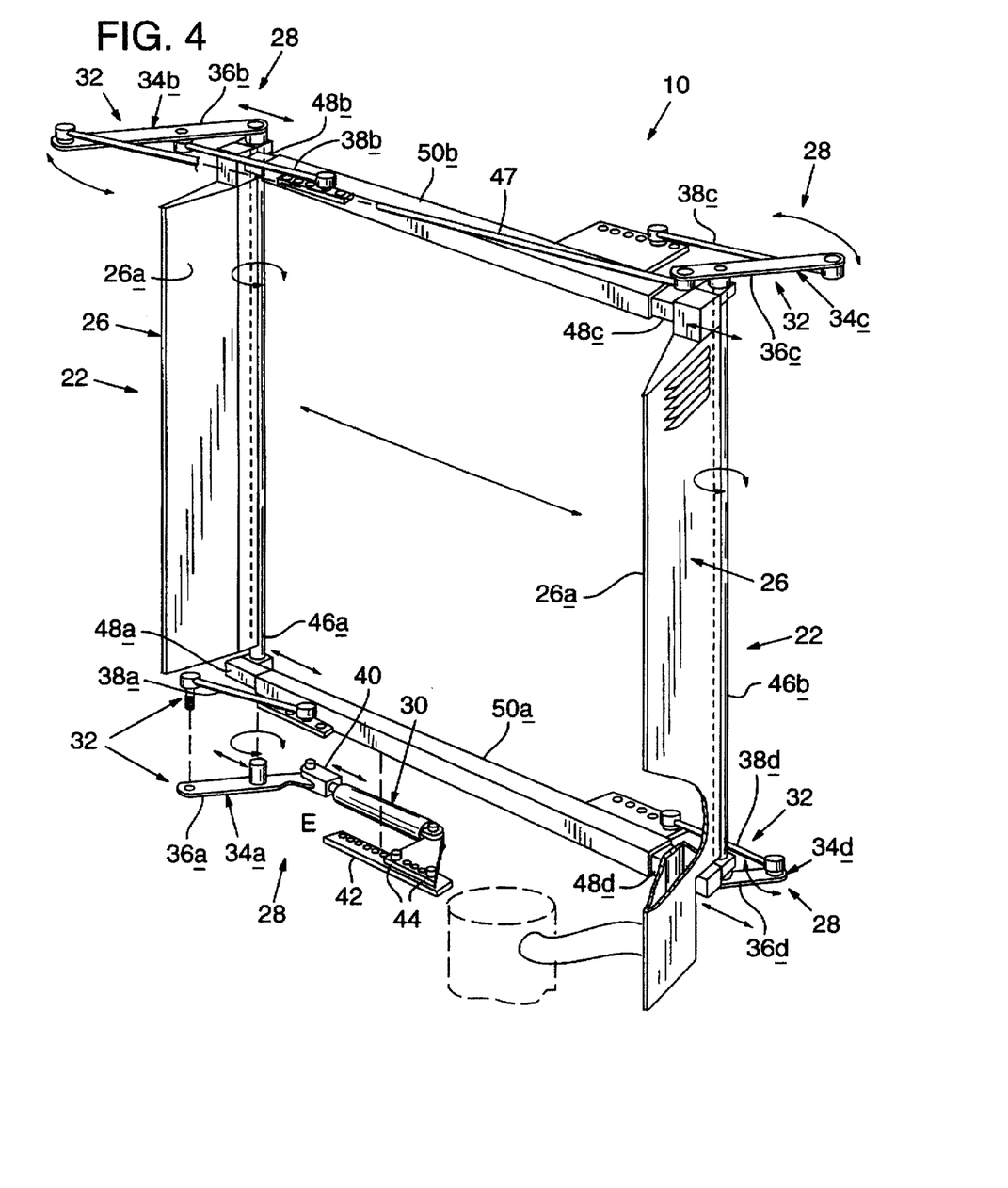
FIG. 4 is an enlarged, fragmentary, isometric view of the tier-pressor mechanism of the invention.

Referring to FIG. 4, arms 26 are each constructed with a vertical expanse 26a that extends forward of front opening 24 (FIG. 1) in load bed 20. As will be described further, pressor structure can be constructed to move the arms to a third, open position in which the arms define a tier-pressor opening that exceeds the dimensions of such opening of the load bed. The third, open position may be the same position as the first neutral position (dashed lines in FIGS. 2–3), or it could be a position in which arms 26 are spaced apart even wider than that shown by dashed lines in FIGS. 2–3.

Referring to FIG. 4, arm-actuator substructure 28 is coupled to each arm and includes a power component, such as hydraulic cylinder 30, which is operable from a single location E to initiate arm actuation. The arm-actuator substructure includes linkage 32 that interconnects the arms.

Linkage 32 includes four linkage submechanisms 34a–d, each including corresponding plate-like members 36a–d and rod members 38a–d. For example, linkage submechanism 32a includes elongate plate-like member 36a which is pivotably attached at one end to a fitting 40 at the operative end of hydraulic cylinder 30. The opposite end of the cylinder is fixed to a bracket 42 via bolts 44, and the plate is suitably attached to a section of the underside of the bale wagon (FIG. 1). The other end of plate-like member 36a is pivotably attached to one end of elongate rod member 38a via a suitable fastener such as a nut and bolt. A vertical rod 46a is suitably fixed to a top surface of plate-like member 36a and rod 46a extends upwardly to plate-like member 36b where it is fixedly attached to a bottom surface thereof. Linkage submechanisms 34b–d have the same interconnections among components as linkage submechanism 34a, and rod 46b interconnects plate-like members 36c and 36d. In addition, a long rod 47 (FIGS. 2 and 4) interconnects plate-like members 36b and 36c for reasons to be described.

Referring to FIGS. 4 and 6, linkage 32 also includes extension/retraction elements 48a–d, pairs of which are received in open ends of sleeve elements 50a–b.

Figure 7:
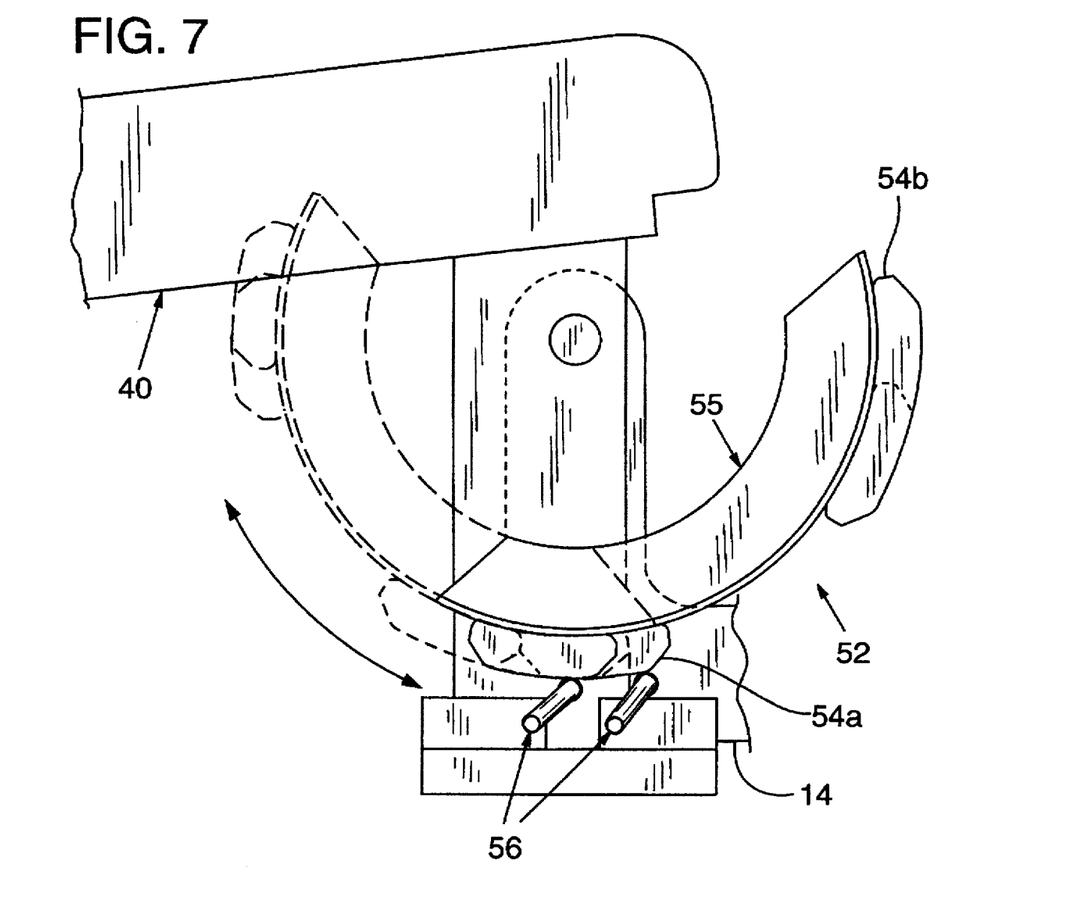
FIG. 7 is an enlarged, fragmentary view of a section of the opposite (right) side of the bale wagon shown in FIG. 1 showing a cam-actuated switch for actuating the tier-pressor of the invention.

Referring to FIG. 7 and also back to FIG. 1, a cam-actuated switch system is shown as the preferred way to trigger actuation of hydraulic cylinder 30 relative to the position and movement of tier-collecting/orienting table 14. System 52 includes a first cam 54a and a second cam 54b. Electric contact elements 56 are located in a suitable housing 58 (FIG. 1) suitably fastened to bale wagon 12. A preferred way to configure the electrical contact elements would be to use commercially available limit switches.

Referring to FIGS. 4 and 7, a suitable, conventional hydraulic system is sufficient for selectively enabling or disabling fluid flow to power cylinder 30 based upon the movement of table 14 and resulting contact between first and second cams 54a–b and electrical contacts 56. The cams are spaced laterally on support arc 55 so that each will contact only a preselected electrical contact, or limit switch. The hydraulic system is preferably one of the hydraulic systems that are used on bale wagons manufactured by J.A. Freeman and Sons. In general, such systems have a nominal system flow of 20 gallons per minute.

It is preferred to divide hydraulic fluid flow to power cylinder(s) (undepicted) for raising table 14, and to power actuation of pressor structure 22 to the above-described, third, open position. By making such division, two things are achieved. First, there is a necessary reduction in fluid flow to the mechanism for lifting table 14 to ensure a soft beginning of the lift as a way to promote keeping all hay bales of the tier on the table during the lift. If full fluid flow is sent to the table-lift mechanism, the table tends to have a hard beginning of the lift which may cause undesired movement of hay bales during the lift.

Second, the residual fluid flow that is diverted from the table lift hydraulics can be directed for use to power actuation of tier pressor 22. That residual flow is normally diverted and recycled (i.e. unused) into the system to ensure such a soft beginning of the table lift.

Focusing again on load pressor submechanism 11, and referring back to FIGS. 1–1B, it is a submechanism actuable with arms 26 (see FIG. 4) to move inwardly a preselected distance toward the cavity defined by the load bed as a way of pressing arrangements of subunits that have already been pressed by the mechanism (see dashed lines in FIG. 1B), i.e. loaded subunits. Load-pressor submechanism 11 preferably takes the form of opposing horizonal panel elements or side racks 58 that are each pivotably attached at a rear region or end 58a to load bed 20, and fixedly attached using suitable fastening at a front region or end 58b to corresponding arms 26. Suitable fastening includes welding the front end 58b of each side rack 58 to a back surface of a corresponding arm 26 (see FIG. 4). Pivotably to fasten each side rack to load bed 20, it is presently preferred to construct sleeve elements 60 which are sized to fit over post elements 62 that extend upwardly from load bed 20 (see FIG. 1B). Post elements 62 are fixedly mounted to the load bed such as by mounting to a horizontal plate (undepicted) extending outwardly and laterally of the side of load bed 20.

Figure 1A:
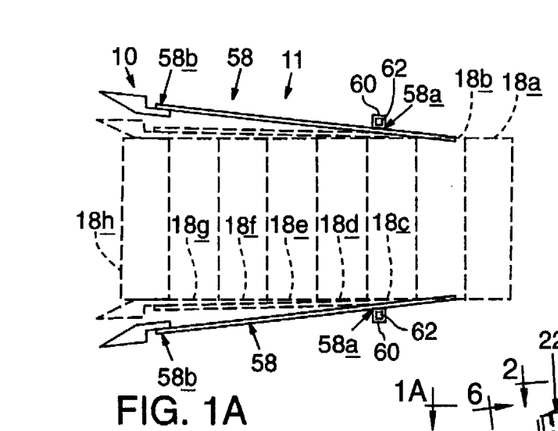
FIG. 1A is a fragmentary top view, on a smaller scale than FIG. 1, of the load pressor mechanism of the present invention.
Figure 1B:
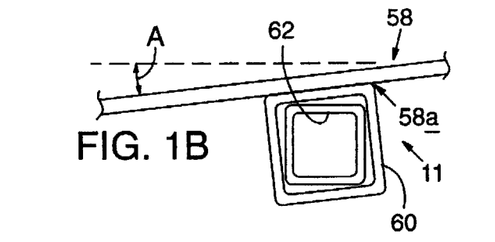
FIG. 1B is a fragmentary view of FIG. 1A on an enlarged scale showing the pivotable attachment of load pressor mechanism of the present invention.

As shown in FIG. 1B, sleeve element 60 is oversized with respect to post element 62 so that a desired, suitable amount of play exists, which play allows the sleeve to rotate a preselected number of degrees, shown by arrow A in FIG. 1B, with respect to the post element about an axis defined by the post element. The presently preferred number of degrees is about 3°–8° and preferably about 4°–5°.

While load pressor structure 11 has been described as being pivotably attached to the load bed to form a funnel-like pressing against loaded tiers, such as tiers 18a–g, it should be understood that any suitable method could be used to allow load-pressor to open and close against loaded tiers. Load pressor structure 11 is preferably actuated with tierpressor structure 10, but load pressor structure 11 could be independently actuable as well, such as by another hydraulic cylinder.

Operation and Preferred Method of Practicing the Invention

In use, referring particularly to FIGS. 2-4, power to hydraulic cylinder 30 (movement outwardly to the left in FIG. 4) will cause extension/retraction element 48a to move outwardly (dashed lines in FIG. 3) which will cause plate-like member 36a to pivot counterclockwise about an axis defined by an outer end 38$a_1$ of rod 38a. Such pivoting of member 36a will cause rod 46a to rotate counterclockwise, causing plate-like member 36b to pivot counterclockwise about an axis also defined by an outer end 38$b_1$ of rod 38b. Of course, extension/retraction element 48b will move outwardly with element 48a because both are connected via rod 46a. Such pivoting of plate-like member 36b will also push long rod 47 to the right in FIGS. 2 and 4, which will cause extension/retraction elements 48c-d to move outwardly. Movement outwardly of element 48c causes like movement of element 48d because of their connection via rod 46b. Such movement of rod 47 will also cause plate-like member 36c to pivot counterclockwise about an axis defined by an outer end 38$c_1$ of rod 38c. Such movement will cause extension/retraction element 48c to extend outwardly of sleeve element 50b, and will also cause corresponding pivoting of plate-like member 36d and extension of extension/retraction element 48d out of sleeve element 50a.

The result is that arms 26 will move to the third, open position shown by dashed lines in FIG. 3 by operation of cylinder 30 from a single location on bale wagon 12. Linkage 32 provides the necessary interconnection of arms 26 to cause such opening. By suitable deactuation of cylinder 30 to retract it, the reverse of the above movements of linkage 32 occurs, causing movement of pressor structure 22 to the second, press position shown by solid lines in FIGS. 2-3.

Using tier pressor 10, a method of stabilizing, or aligning, a tier of hay bales can be practiced. The tiers are received into an opening, like front opening 24 (FIG. 1) of load bed 20 of bale wagon 12. The method includes the steps of positioning the tier in front opening 24, and pressing (or aligning) the tier by moving pressor (or alignor or tier-pressor) structure 22 against opposing sides of the tier. Preferably, the method also includes stopping the pressing/aligning by moving arms 26 of tier-pressor structure 22 away from opposing sides of the tier. In addition, the preferred practice also includes providing opposing vertical expanses 26a on arms 26 of tier-pressor structure 22 that extend forward of front opening 24 of load bed 20, and opening tier-pressor structure 22 by moving arms 26 to a position in which the arms define a tier-pressor opening (C in FIG. 3) that exceeds the dimensions of front opening 24 (FIG. 1) of load bed 20.

Viewed another way, tier pressor 10 and load pressor 11 form a combination tier and load pressor for use in an automatic bale wagon to press successive entering tiers of bales of hay that are received into an opening of a load bed associated with such bale wagon, and to press loaded tiers that are moved by successive entering tiers through the opening of the load bed and into a cavity defined by the load bed.

The combination tier and load pressor of the invention also provides for a method of stabilizing successive tiers of hay bales that are received into an opening of a load bed that defines a cavity associated with an automatic bale wagon, with such tiers being characterizable as entering tiers and loaded tiers. The steps of the method of the invention include positioning a first one 18 of such entering tiers in such opening of load bed 20 (see FIG. 1), and pressing the first entering tier by moving tier-pressor structure 10 against opposing sides of the tier.

The method also includes repeating the positioning step with respect to a second entering tier which causes the first entering tier to move rearwardly into the opening of the load bed thereby being characterizable as a first loaded tier. See for example FIG. 1A which shows several loaded tiers 18a-g formerly characterizable as entering tiers. Also included is the step of pressing the second entering tier by moving tier-pressor structure against opposing sides of the second entering tier. Again refer for example to FIG. 1A which shows a subsequent entering tier 18h. The method also includes pressing the first loaded tier by moving load-pressor structure against opposing sides of the first loaded tier. Again refer for example to FIG. 1A which shows in dashed lines load pressor structure 11 pressing against opposing sides of loaded tiers 18a-18g. The method also preferably further includes the step of stopping the pressing by moving the tier-pressor structure and load-pressor structure away from opposing sides of the tiers (see solid line depiction of tier-pressor structure 10 and load-pressor structure 11 in FIG. 1A).

It should also be appreciated by viewing FIG. 1A, that load-pressor structure 11 is openable by moving horizontial panel elements 58 to a position (see solid lines) in which the elements define a load-pressor opening that exceeds the dimensions of the cavity defined by the load bed.

The present invention therefore achieves the above objects by providing a tier pressor which overcomes the drawbacks of prior-art proposals. By using tier pressor 10 and load pressor 11 in an automatic bale wagon, a system is provided that adds vertical stability to such tiers, and is capable of receiving tiers of hay bales that have irregular dimensions such as widths. Tier pressor 10 and load pressor 11 also provide a system that reduces the incidence of tiers collapsing in the load bed while the bale wagon is traveling through the field. In addition, tier pressor 10 can be cost-effectively manufactured.

Accordingly, while a preferred embodiment of the invention has been described herein, it is appreciated that modifications are possible that are within the scope of the invention.

It is claimed and desired to secure by Letters Patent:

1. A method of stabilizing successive tiers of hay bales that are received into an opening of a load bed that defines a cavity associated with an automatic bale wagon, with such tiers being characterizable as entering tiers and loaded tiers, comprising the steps of:

positioning a first one of such entering tiers in such opening of such load bed; laterally pressing the first entering tier by moving a tier-pressor structure against opposing sides of the tier;

repeating the positioning step with respect to a second entering tier which causes the first entering tier to move rearwardly into the opening of the load bed thereby being characterizable as a first loaded tier;

laterally pressing the second entering tier by moving the tier-pressor structure against opposing sides of the second entering tier;

laterally pressing the first loaded tier by moving a load-pressor structure against opposing sides of the first loaded tier;

continuing the positioning and repeating steps as desired; and providing opposing vertical expanses on the tier-pressor structure that extend forward of such opening of such load bed, opening the tier-pressor structure by moving the arms to a position in which the arms define a tier-pressor opening that exceeds the dimensions of such opening of the load bed, providing opposing horizontal panel elements on the load-pressor structure that extend adjacent the sides of such load bed and rearward of such opening, and opening the load-pressor structure by moving the horizontal panel elements to a position in which the arms define a load-pressor opening that exceeds the dimensions of such cavity of the load bed.

2. The method of claim 1, further including the step of stopping the pressing by moving the tier-pressor structure and the load-pressor structure away from opposing sides of the tiers.

* * * * *